Patented Sept. 1, 1925.

1,552,270

UNITED STATES PATENT OFFICE.

JAMES J. BURKE, OF TULSA, OKLAHOMA.

ARTIFICIAL STONE AND PROCESS FOR MAKING SAME.

No Drawing.    Application filed February 15, 1924. Serial No. 693,132.

*To all whom it may concern:*

Be it known that I, JAMES J. BURKE, a citizen of the United States of America, and resident of Tulsa, in the county of Tulsa and State of Oklahoma, have invented certain new and useful Improvements in Artificial Stone and Processes for Making Same, of which the following is a specification.

This invention relates to the manufacture of artificial marble or stone for wainscotings, frieze, panels, mantels, etc., and the process of making same and has particular reference to the composition thereof and the method of combining the ingredients of said composition.

Heretofore, artificial marble has been made by a veneered process, which has two different setting propensities, and inclined to separate and warp in the slab, or by casting sand, cement, lime, etc., on a smooth surface, which will corrode, pit and craze or check.

I have discovered a simple inexpensive chemical combination, which when mixed with water for wetting concrete, acts as a filler, densifies the mass, intensifies and perpetuates the glaze and positively prevents the surface from crazing, pitting or checking. I further claim to have discovered a homogeneous method of making artificial marble with a higher glazed and harder surface than any of the veneered products.

It is an object of this invention to produce artificial marble or stone of utility for commercial purposes, and it is a further object of this invention to produce such marble or stone by a process which will result in ornamenting or coloring and glazing the marble or stone, while at the same time the stone and its coloring and glazing is made in a homogeneous and monolithic mass having uniform setting propensities throughout.

In carrying the process into practice, I employ a mixture of water-proof cement, screened and washed sand, boric acid and sodium silicate, substantially in the proportions of one part of cement, to two or more parts of sand, the amount of sand used depending upon the strength desired. When the ingredients aforesaid are commingled in any suitable manner in their dry state, they are then wetted and thoroughly mixed with a liquid mixture, hereinafter described, so as to form a plastic or flowing mass which may be molded into any shape desired. The moistening mixture is formed by dissolving in about forty gallons of water, sodium silicate (soluble glass) and boric acid; the proportions of these may be varied within certain limits, but I prefer to use about four pounds of sodium silicate to two pounds of boric acid. These chemicals act as a filler, densify the mass and glaze the finished surface.

In the production of an artificial stone where uniform coloring is desired, other than the natural color imparted by the mixing of the aforesaid ingredients, it is necessary to add a coloring matter to the mass and mix it with the mass thoroughly before it is poured onto the mold. The mass with the coloring matter added is then vibrated as in the foregoing description and allowed to stand ten days and should be moistened or wetted twice daily during the ten day setting period. At the expiration of the ten day period, the slab is removed from the mold, will be found to be perfectly smooth, well glazed, nonporous and water-proof, and ready for shipment.

It has been found desirable to use Medusa white water proof cement as a base, although white Atlas, Portland cement with water proofing compounds may be used with good result.

In the production of a homogeneous and monolithic mass having variegated colors, each color is to be mixed with a natural mass in separate batches and poured onto the mold or plate in quantities and forms desired, but in practice, all of the compositions with the different colors and the remaining mass that is to produce the remainder of the body of the stone would be poured as expeditiously as possible in order that there would be no perceptible setting of any of the batches of material that had been poured prior to the filling of the mold so that the setting process would be carried on throughout the mass practically simultaneously, a condition which would result in the formation of a homogeneous and monolithic slab.

I claim the above described method of manufacturing artificial marble is novel and superior, because the action of the boric acid on the sodium silicate tends to harden and crystallize the latter, and when used in solution to wet the ingredients becomes an integral part of the mass, acting as a filler, closing the pores, and naturally intensifying and enhancing the glaze, and prevents the surface from crazing, pitting and checking.

The advantages I claim in my application for a patent on artificial marble over those now in existence or registered in the Patent Office lies in the fact that I have invented a composition which simplifies the manufacturing, which reduces the cost and which produces a more natural, a more durable and better marble substitute than heretofore was known. I claim the advantage of having eliminated the chemical cements used in other artificial marbles and enhancing and enriching the strength of natural cement.

I claim:—

1. The herein described process of making artificial stone or marble, consisting in mixing one part water-proof cement with two parts screened and washed sand, wetting with a solution made by adding to forty gallons of water, four pounds of sodium silicate and two pounds of boric acid, sufficient solution being added to ingredients to form a plastic or flowing mass, and wetting the surface at intervals while curing.

2. The herein described process of making artificial stone or marble, consisting in mixing water-proof cement with screened and washed sand while in a dry state, in mixing therewith a solution consisting of water, sodium silicate and boric acid to form a plastic or flowing mass, in adding coloring matter to different batches of the mass and pouring the color contained batches in a mold successively and before setting of the masses of any of the batches occurs, and permitting the combined masses to harden simultaneously.

3. The herein described artificial stone or marble, consisting of cement, sand, water, sodium silicate, boric acid, mixed together, substantially as described.

4. The herein described artificial stone or marble, consisting of cement, sand, and solution composed of water, sodium silicate and boric acid, mixed together, and a mass of sand, cement, water, sodium silicate and boric acid having coloring matters added molded with the first mentioned mass prior to the setting of either mass for producing a homogeneous and monolithic and glazed product.

JAMES J. BURKE.